United States Patent [19]
Holtz

[11] 3,723,974
[45] Mar. 27, 1973

[54] DATA COLLECTION APPARATUS AND METHOD

[76] Inventor: Klaus E. Holtz, Adalbertstrasse 104, Munich, Germany

[22] Filed: Mar. 8, 1971

[21] Appl. No.: 121,657

[52] U.S. Cl. ....... 340/172.5
[51] Int. Cl. ....... G06f 3/00
[58] Field of Search ....... 340/172.5

[56] References Cited

UNITED STATES PATENTS

| | | | |
|---|---|---|---|
| 3,454,936 | 7/1969 | Bridge | 340/172.5 |
| 3,566,365 | 2/1971 | Rawson | 340/172.5 |
| 3,281,789 | 10/1966 | Willcox | 340/172.5 X |
| 3,314,051 | 4/1967 | Willcox | 340/172.5 |
| 3,512,139 | 5/1970 | Reynolds | 340/172.5 |
| 3,541,513 | 11/1970 | Paterson | 340/172.5 X |
| 3,623,001 | 11/1971 | Kleist | 340/172.5 |

*Primary Examiner*—Paul J. Henon
*Assistant Examiner*—Sydney R. Chirlin
*Attorney*—Townsend & Townsend

[57] ABSTRACT

Apparatus and a method of collecting data from analog or digital sources wherein the data is initially stored in accordance with a particular program and then read out to a time-share computer remote from the data collection station. Any one of a number of different programming languages can be used to effect the storage and read-out of the data and communication with the time-share computer can be accomplished under existing transmission facilities in a format acceptable to the computer. A typewrite terminal can be utilized with the apparatus and can communicate with the computer without interferrence from the apparatus.

11 Claims, 14 Drawing Figures

INVENTOR.
KLAUS E. HOLTZ
BY Townsend and Townsend
ATTORNEYS

INVENTOR.
KLAUS E. HOLTZ

BY Townsend and Townsend

ATTORNEYS

INVENTOR
KLAUS E. HOLTZ
BY Townsend and Townsend
ATTORNEYS

INVENTOR
KLAUS E. HOLTZ
BY Townsend and Townsend
ATTORNEYS

INVENTOR
KLAUS E. HOLTZ
BY Townsend and Townsend
ATTORNEYS

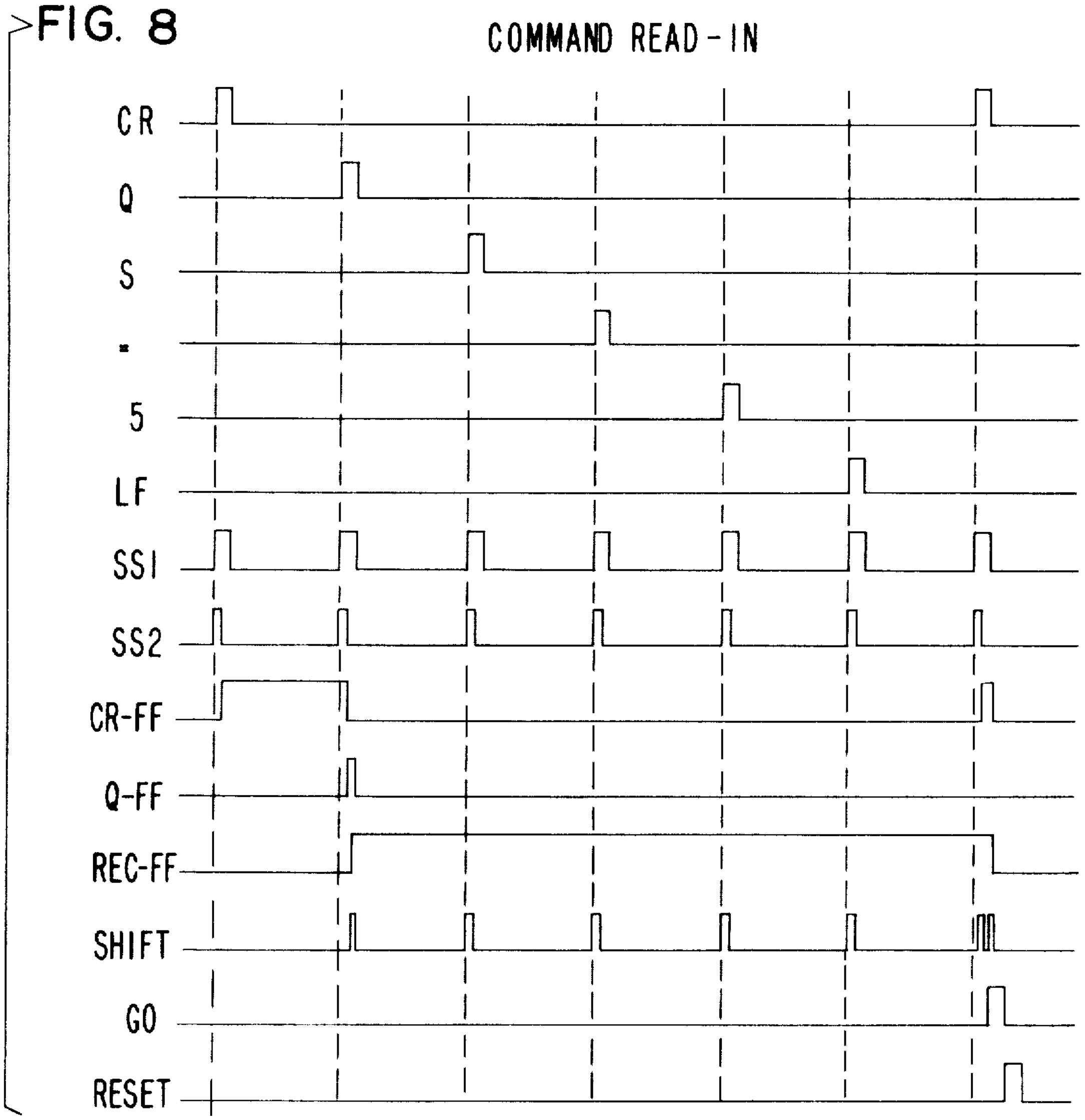
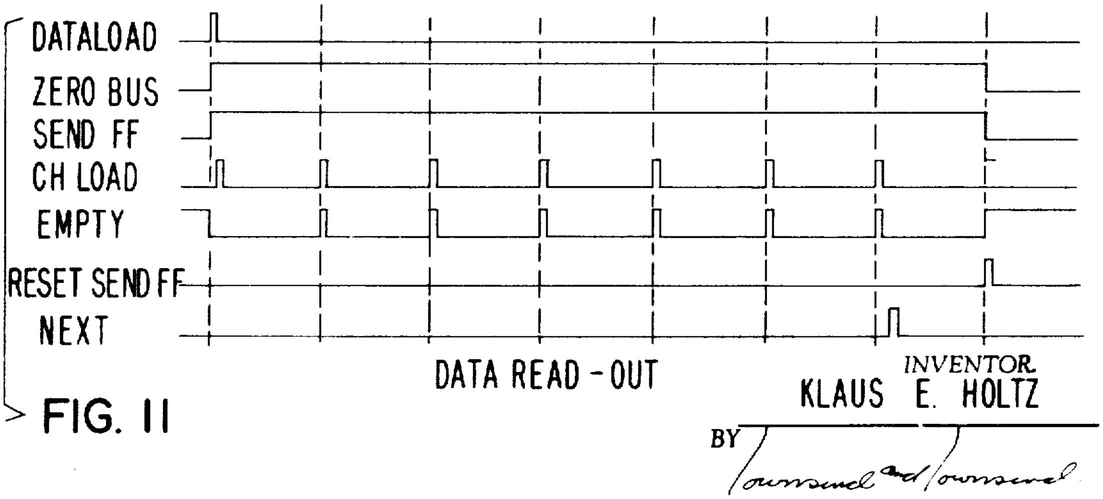
FIG. 11
INVENTOR
KLAUS E. HOLTZ
BY Townsend and Townsend
ATTORNEYS

CHARACTER READ OUT

INVENTOR.
KLAUS E. HOLTZ

BY Townsend and Townsend

ATTORNEYS

DATA COLLECTION APPARATUS AND METHOD

This invention relates to improvements in the use of a time-share computer and, more particularly, to apparatus and a method for enabling users of time-share computer terminals to direct analog or digital data to the computer itself.

A recent advance in the field of data processing has been the establishment of time-share computer centers in many locations across the United States. The presence of computers at these centers allows a large number of companies and others to utilize the services of these computers, yet be located long distances away from them. Communication with the computers is accomplished by the use of telephone lines and to enter data into the computer and to read data out of the same merely requires a typewriter terminal and a telephone connection to the computer itself. Data and programs are typed into the computer by hand on a typewriter terminal.

In the present state of the art, data to be processed must be typed into the typewriter terminal using the correct format statements of the programming language. Data, such as fast varying analog data or direct instrument outputs, cannot be analyzed with the present available equipment for two reasons: firstly, data cannot be typed into the typewriter terminal fast enough to follow analog data sensors, and data generated by analog to digital converters or similar instruments do not display the data in a format acceptable to a time-share computer. A need, therefore, arises for apparatus and a method to overcome these problems so that both analog and digital data can be fed directly to a time-share computer without requiring that the data be typed into the typewriter terminal for feeding to the computer as is presently required.

The present invention provides apparatus and a method which overcomes the problems of existing equipment and techniques by enabling the connection of analog and digital sensors to a time-share computer so that both analog and digital data can be collected, stored and then read to the time-share computer using high level programming languages, such as FORTRAN, PL–1, or BASIC. The invention permits communication with a time-share computer over existing facilities in a format acceptable to the computer. As to the computer, the data will appear to have been typed in by hand on a typewriter terminal.

In carrying out the teachings of the present invention, a user merely connects the analog or digital output to the external connectors. No adjustments on external dials are necessary. All parameters, such as data frequencies, number of data points to be collected, and timing are internally programmable through a typewriter terminal. Moreover, the time-share computer could be programmed to supply such parameters to thereby make routine runs fully automatic.

In handling analog data in accordance with the present invention, the data is first digitzed and thereafter presented to a time-share computer in a readable form. To convert analog data into digital data so as to be readable by the time-share computer, the analog data must be sampled periodically. The sampling rate is dependent upon the highest frequency component of the analog data to be recognized. For instance, heart beats or brain waves require up to 200 samples per second while water pollution analyzers need to be sampled only about every 5 minutes.

Another consideration is the number of samples necessary to describe a complete event. The number of samples is determined by the sampling rate multiplied by the time required to complete the event. For recording heart beats, the event lasts for about 1 second; thus, a total of 200 data points are necessary to describe one heart beat. For recording water pollution data during a 24-hour period, 288 data points are required if sampling is taken every 5 minutes.

In the present invention, an analog voltage, when sampled, is converted to a digital value which is temporarily stored. A main reason for storing this digital data is that, since telephone lines carry only 15 characters per second and each data point consists of about 5 characters, the maximum sampling rate would be 3 samples per second. However, with a digital storage device the data can be stored very rapidly, up to 10,000 samples per second and thereafter read out from the storage unit to the computer at a speed compatible with the telephone line. An analog event might, therefore, last for only a fraction of a second but it may take minutes to transmit the data to the time-share computer.

In collecting analog data about events which are relatively slow such as a water pollution event, the storage device is advantageous for a different reason. Time-share computer centers charge for their services with a monthly charge plus processor usage and also charge for the time in which the typewriter terminal is connected to the computer. For a 24-hour record of a water pollution event consisting of 288 data points, the data collection terminal of this invention would store the data automatically without being linked to the computer. At the end of the event, the data could be transmitted to the computer within a smaller interval of time such as 1 to 2 minutes to thereby minimize computer charges.

Among the other features of the invention are the following: digital data can be stored temporarily at high speed and before the data is read to the time-share computer; only a minimum of adjustment is needed to carry out the method of the invention; initial programming can be done either by a typewriter terminal or by the time-share computer itself; data in any one of a number of different forms can be presented so as to be acceptable to different types of computers; an error code output can be given for both internal and external errors; analog and digital data can be fed in parallel to the temporary storage unit; sampling rate, number of samples taken and the starting address of a data collection even can be easily programmed into the apparatus; the apparatus may have special features available such as programmable switches to control external instruments, analog or digital outputs, storage scope displays or the like; the apparatus is capable of operating as a remote data collection station without operator attention and with or without a typewriter terminal so that, to the computer, it would appear that the data received by the computer had been typed not by hand; and the apparatus is inexpensive to produce and to operate.

The invention is suitable for a wide range of uses and can, for example, be utilized in the medical field in recording pressure waves for computer analysis of cardiac defects, for computerizing brain wave analysis, for coronary monitoring and for reading, recording and filing of outputs from clinical laboratory instruments to thereby automate laboratory procedures. In the meteorology field, the invention can be used in an automated weather station to collect data and read it to a computer. In monitoring air and water pollution, mobile and stationary analyzers can be used to collect data to be read by a time-share computer. In the general science field, outputs of analyzing instruments, such as laboratory spectrometers, gas chromatographs and the like, can be analyzed and read by the computer. Stress and pressure data from building or bridge constructions can also be collected and analyzed by the computer. A small computer can be coupled with the time-share computer to exchange data therewith.

The primary object of this invention is to provide apparatus and a method of data collection wherein analog or digital data can be collected and directed to a time-share computer using high level programming languages without having to type the data in by hand as is presently required with conventional equipment and techniques.

Another object of this invention is to provide apparatus and a method of the type described which can be used to place analog or digital data in the proper format acceptable to a time-share computer by relatively simple, inexpensive equipment which can be coupled to a typewriter terminal in a manner so as not to interfere with the communication between the typewriter and a remote time-share computer.

A further object of this invention is the provision of apparatus and a method of the aforesaid character which permits data collection facilities to be easily programmed either by a typewriter terminal or a time-share computer to allow the collection unit to be fully automated and left unattended for long periods of time.

Other objects of this invention will become apparent as the following specification progresses, reference being had to the accompanying drawings for an illustration of an embodiment of the apparatus of the invention.

Figure 2:
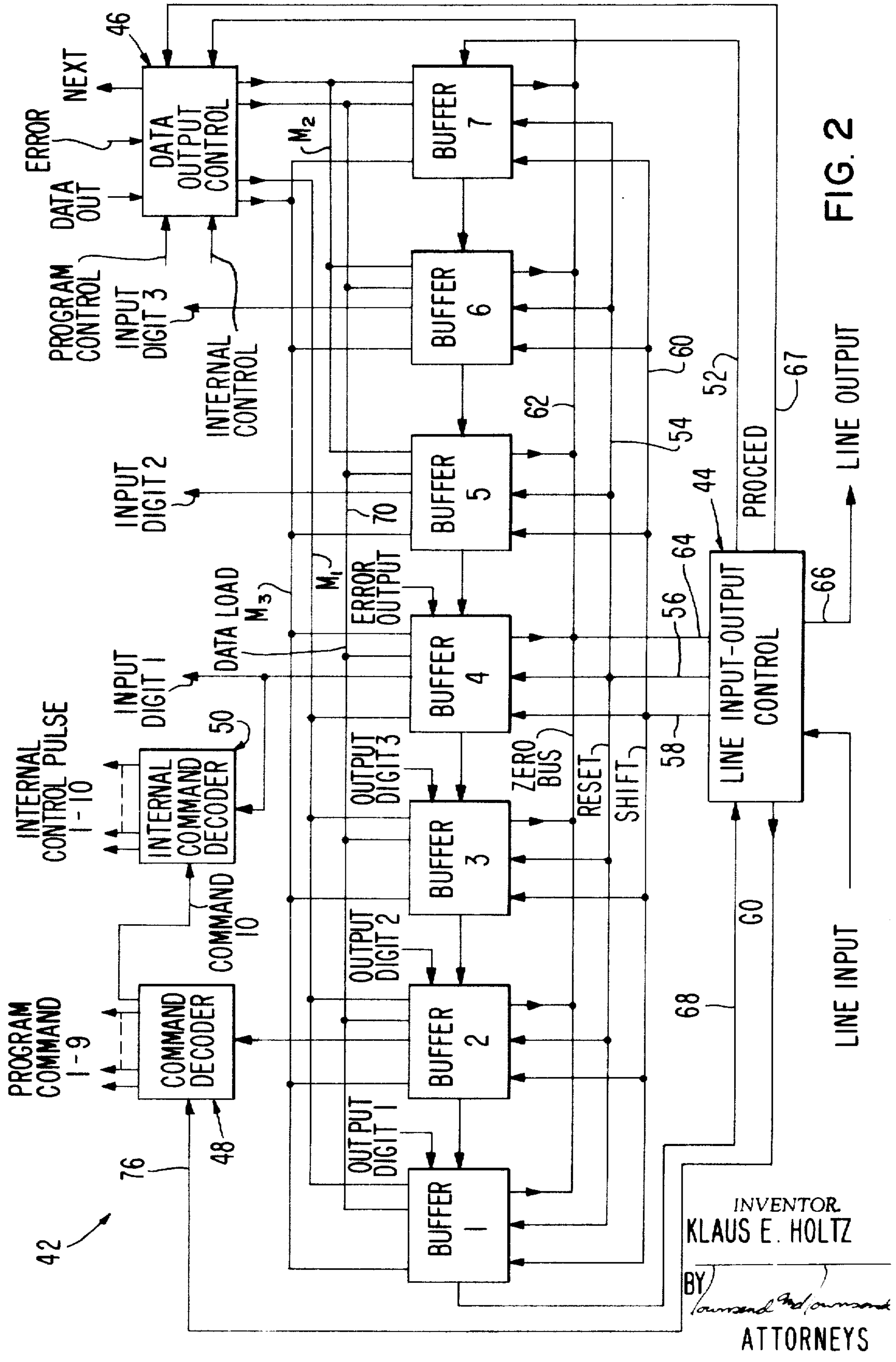
FIG. 2 is a block diagram of the buffer stage forming a part of the line control of the terminal.
Figures 2A, 2B, 5:
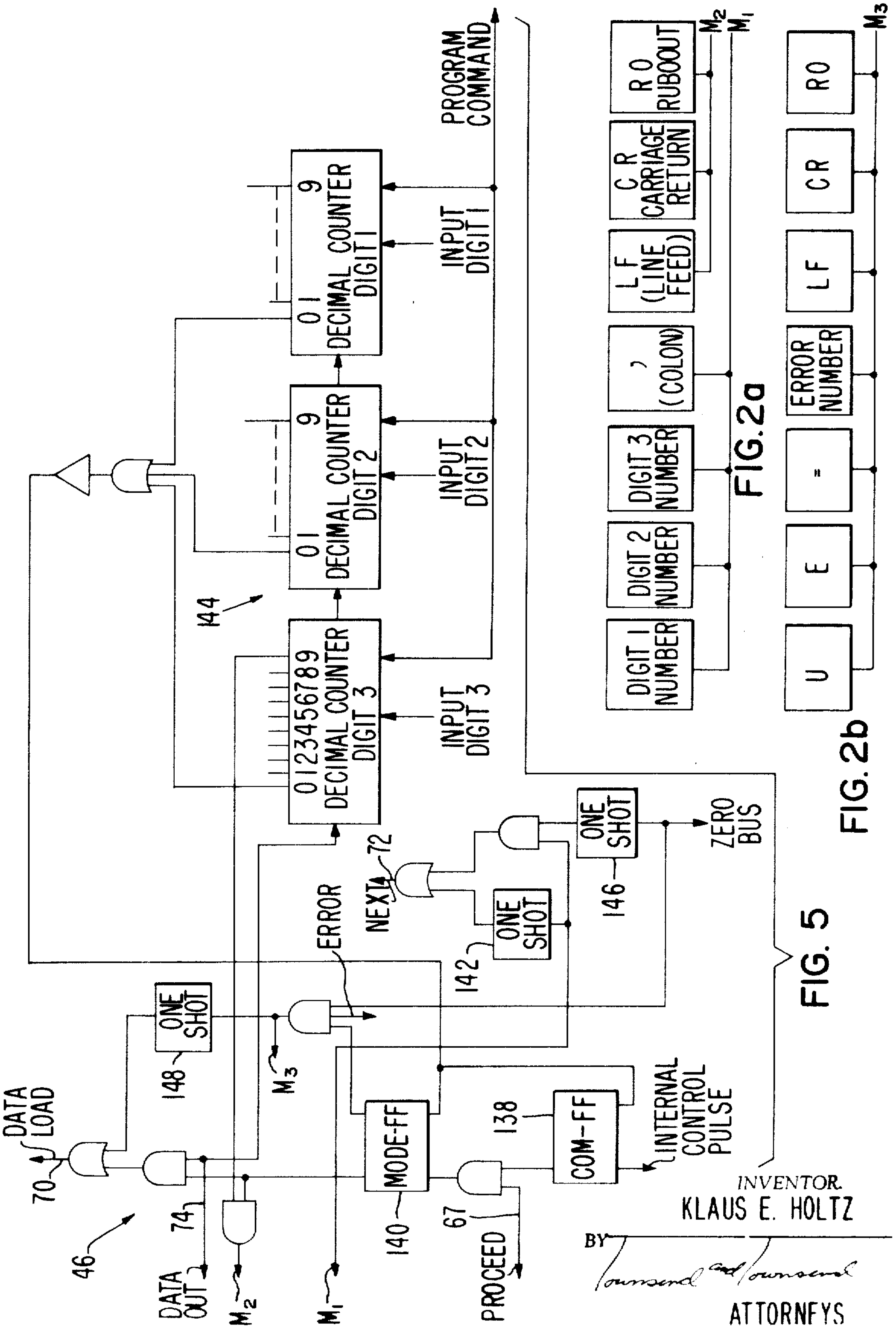
Figure 3:
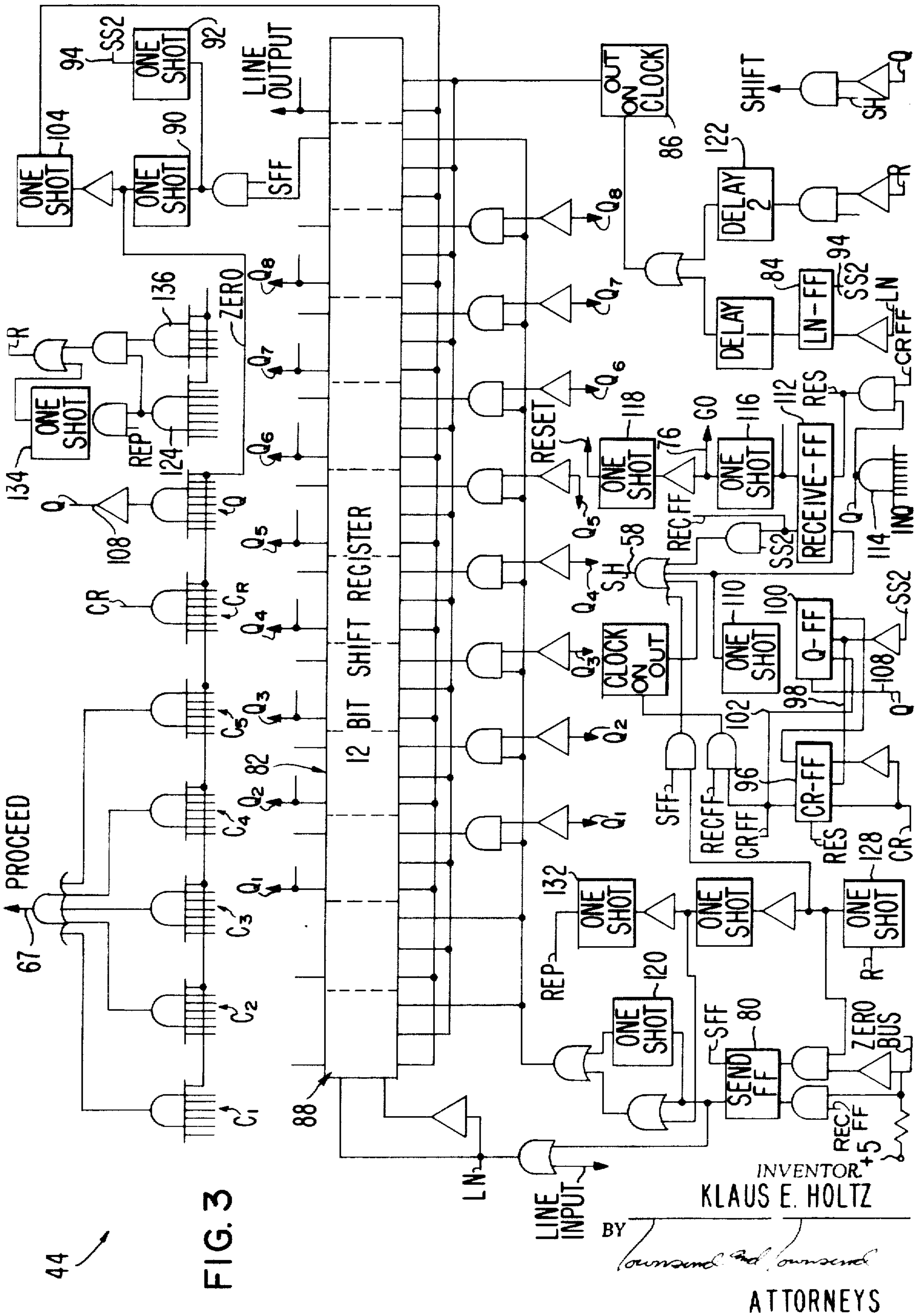
Figure 4:
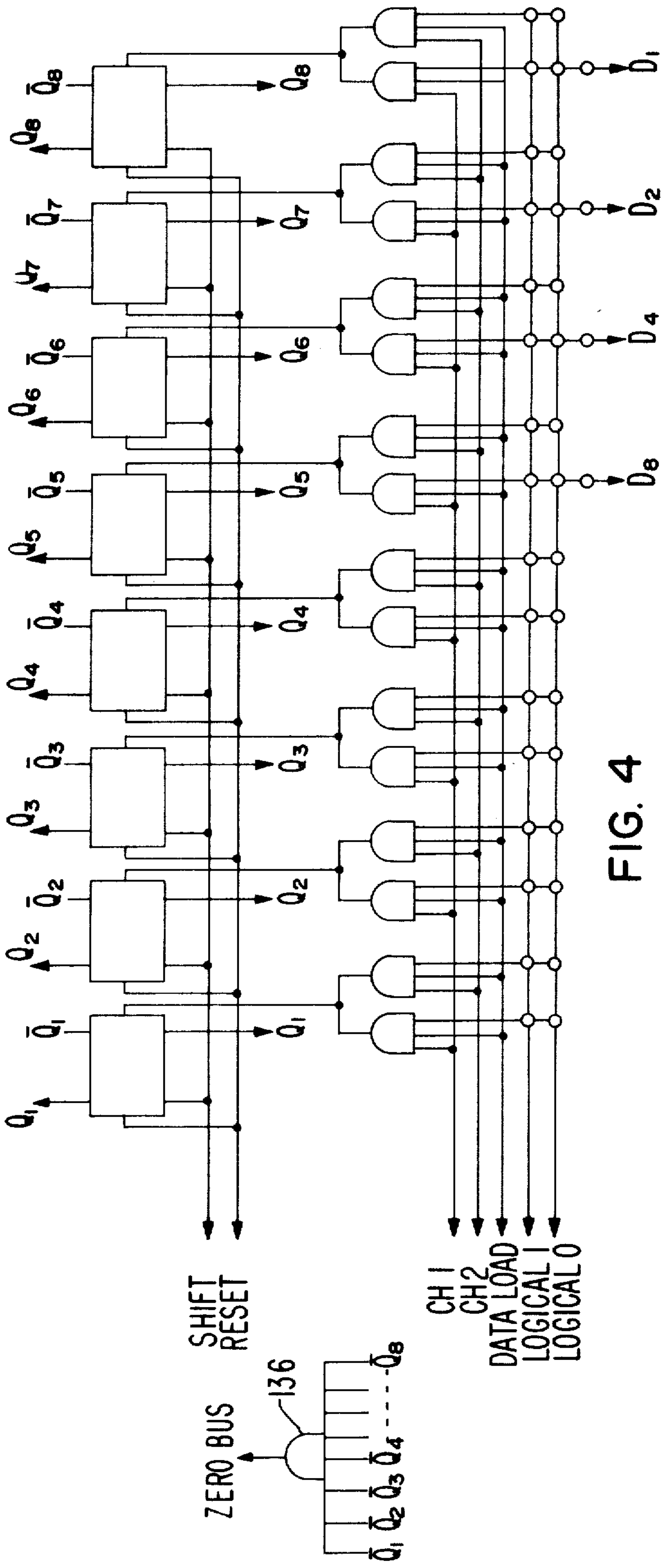
Figure 7:
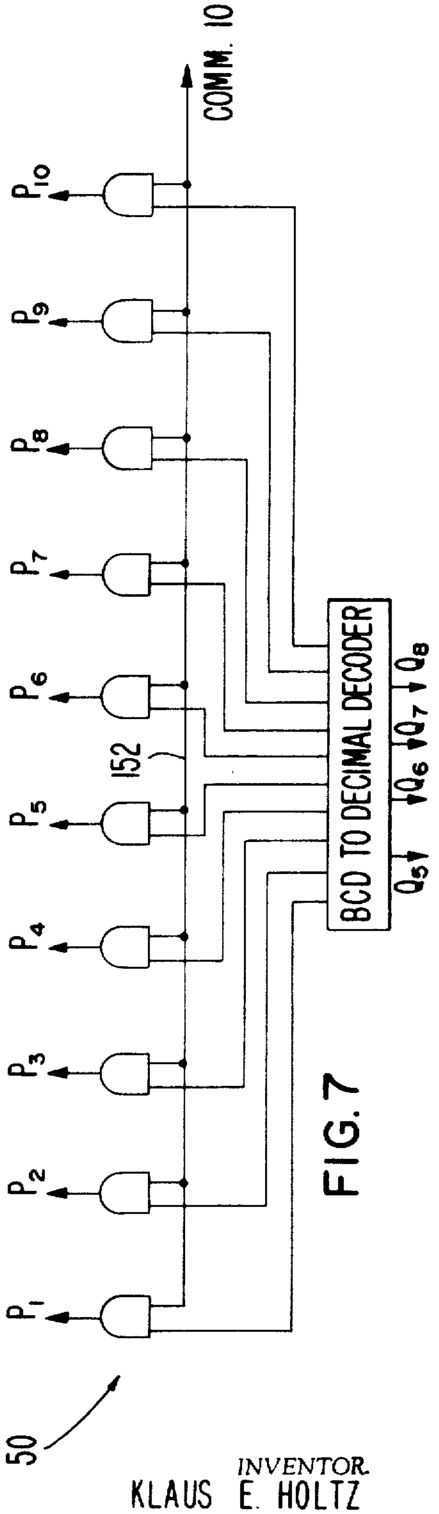
Figure 6:
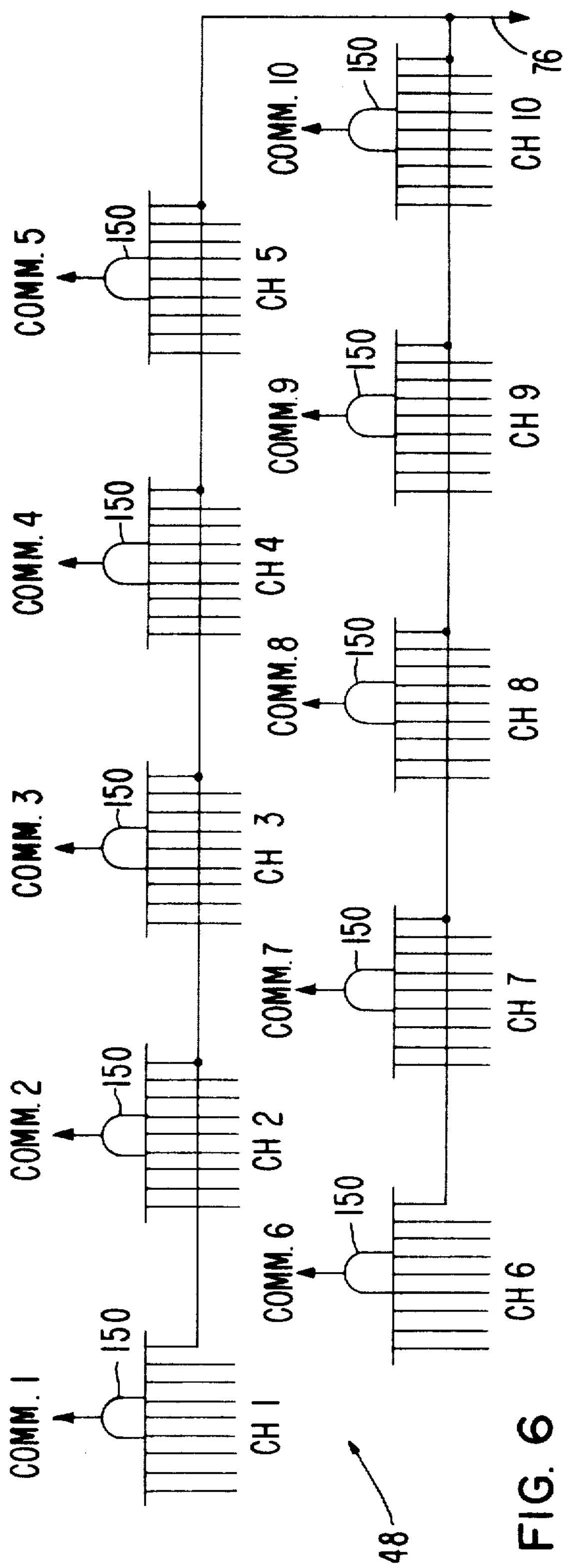
Figure 6A:
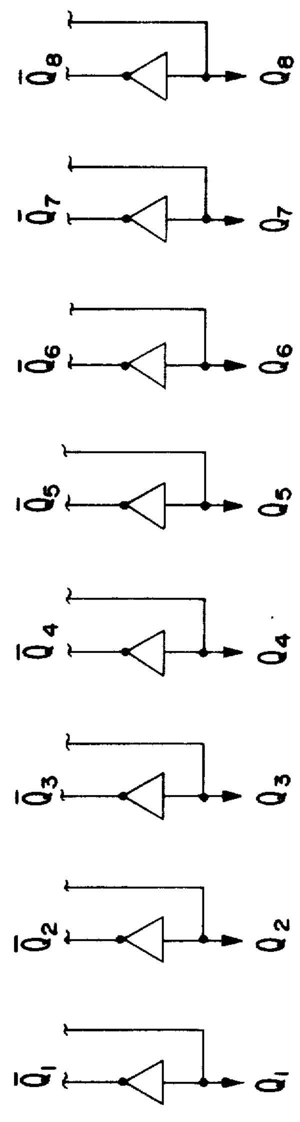
Figure 9:
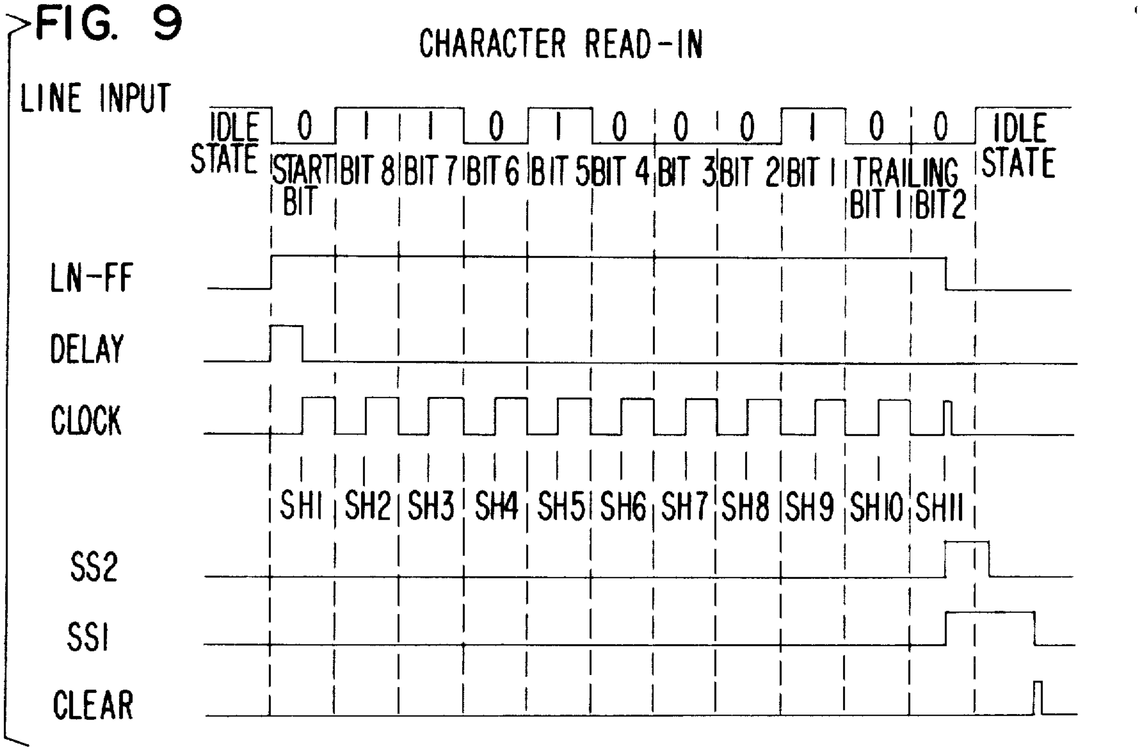
Figure 10:
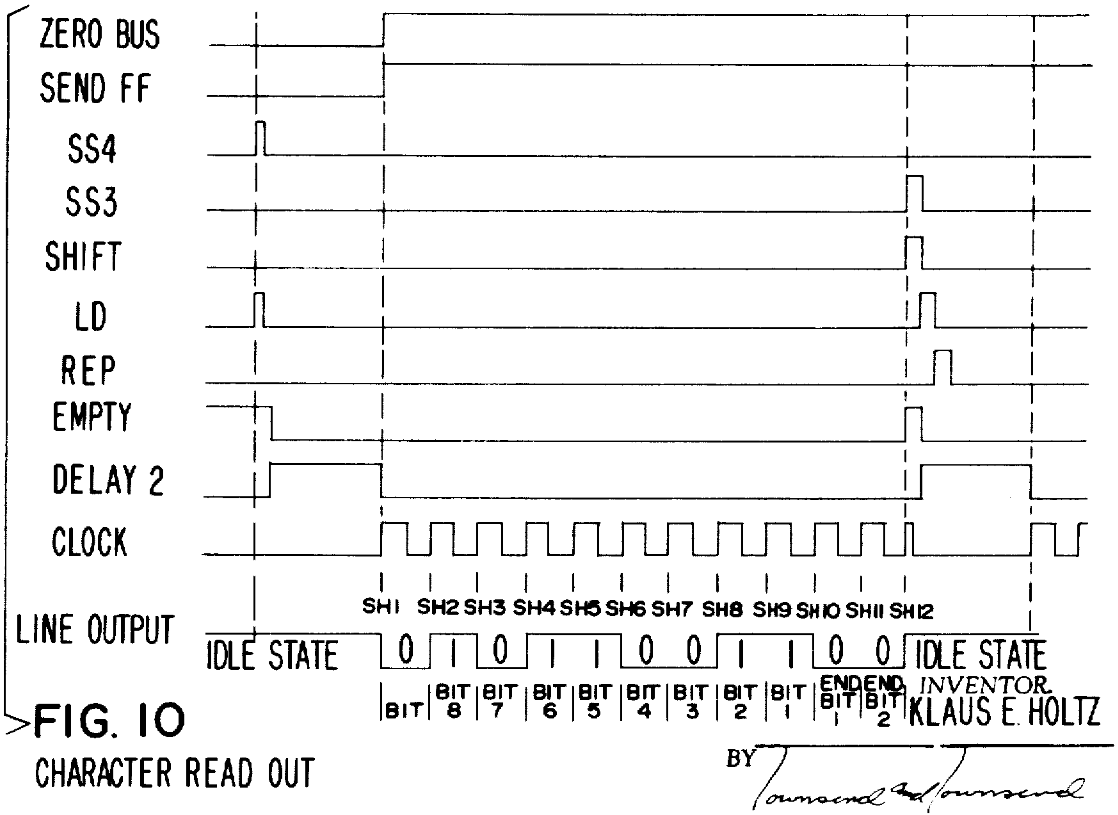

FIGS. 2*a* and 2*b* are block diagrams of the buffer stage in a more generalized form;

FIG. 3 is a block diagram of the input-output control forming another part of the line control of the terminal;

FIG. 4 is a block diagram of one of the buffer units used in the buffer stage shown in FIG. 2;

FIG. 5 is a block diagram of the data output control connected to the buffer stage shown in FIG. 2;

FIG. 6 is a block diagram of the command decoder also connected to the buffer stage in FIG. 2;

Fib. 6*a* is a block diagram of the apparatus for inverting a signal used with the command decoder;

FIG. 7 is a block diagram of the internal command decoder connected to the buffer stage of FIG. 2;

FIG. 8 is a timing diagram for the command, QS=5, illustrating a command read-in step of the method of the invention;

FIG. 9 is a timing diagram for the character "Q" (ASC II) illustrating a character read-in step of the method;

FIG. 10 is a timing diagram of the readout of character "3" illustrating a character readout step of the method; and FIG. 11 is a timing diagram illustrating a data readout step of the method.

Figure 1:
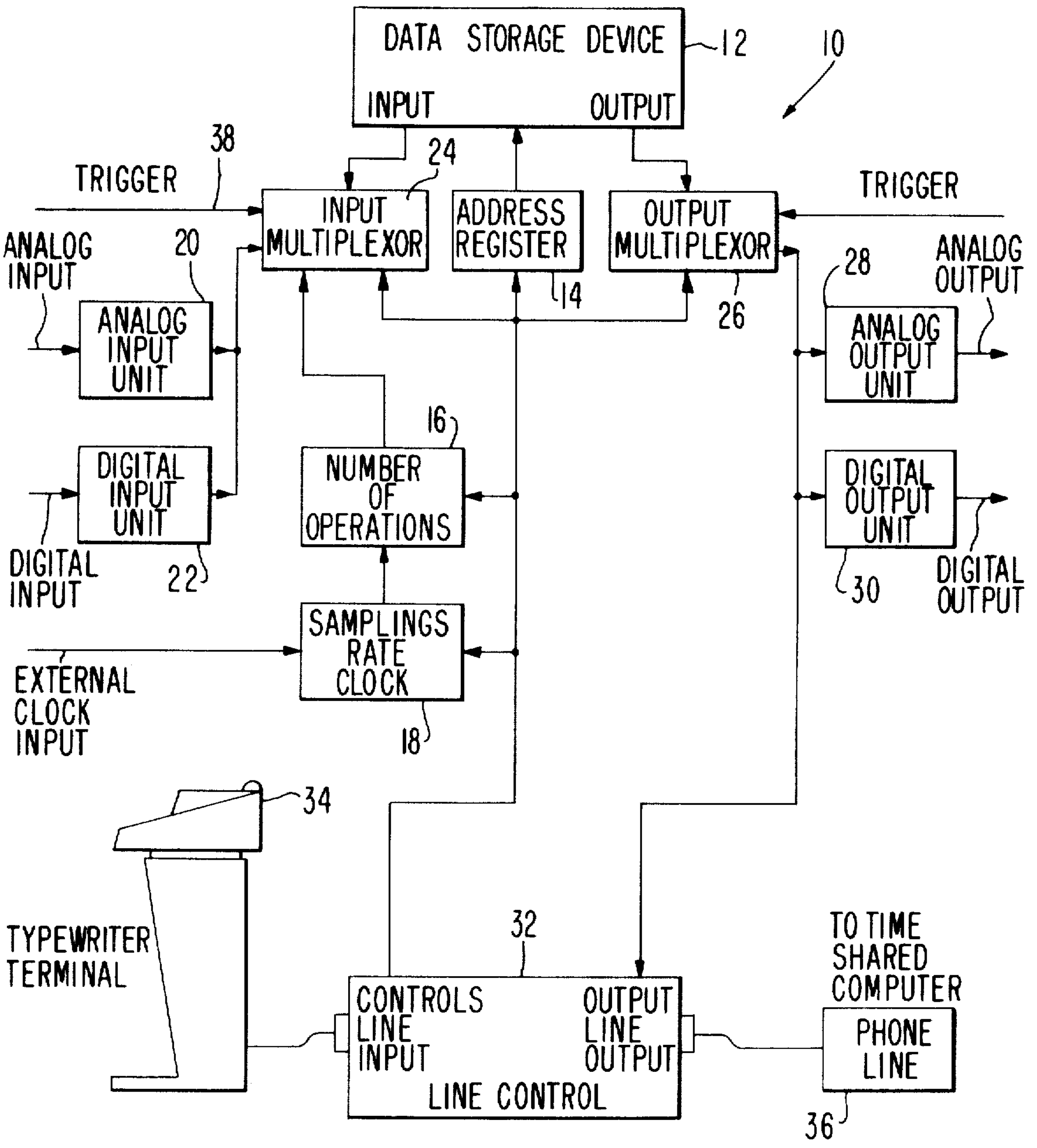
FIG. 1 is a block diagram of the data collection terminal of this invention.

The data collection terminal of this invention is broadly denoted by the numeral 10 and is shown in block form in FIG. 1. Terminal 10 includes a data storage device 12, a storage address counter or register 14, a register 16 which establishes the number of operations to be sampled by the terminal in collecting analog data, a sampling rate clock 18, data input devices including an analog input device 20 and a digital input device 22, an input multiplexor 24, an output multiplexor 26, a number of output devices including an analog output device 28 and a digital output device 30, and a line control unit 32 which couples the foregoing components with a typewriter terminal 34 and a telephone line 36. Thus, by virtue of control 32, communication can be established between the storage device 12 and either typewriter terminal 34 or telephone line 36. Since a time-share computer can be communicated with by telephone, communication between storage device 12 and a time-share computer can thereby be established. Also, typewriter terminal 34 can be used to type in programmed data such as the number of samples of analog data to be read, the sampling rate, and the starting address in the storage device 12.

Each of the input devices 20 and 22 comprises a register and, upon receipt of a trigger pulse on line 38 at the input of multiplexor 34, registers 20 and 22 are scanned by the multiplexor and the data is transferred, one register output at a time, to storage device 12. There can be one or more input devices and such devices can include analog-to-digital converters, digital inputs, pulse counters and the like.

Storage device 12 provides a fast data entry and buffering. Data from the input devices 20 and 22 are collected rapidly and stored in device 12 until readout of the data. The storage device may be any one of a number of different types, including a magnetostrictive delay line, a core memory, a rotating disk or drum memory. To facilitate rapid data entry into slow access storage devices, for instance, delay lines, disks or drums, the available storage capacity is divided into a number of words or slots. To enter the data, the electronic logic would wait for an empty word or slot on the storage device and then transfer the data plus the address into the storage device. On readout, the electronic circuit would wait for the specified address to appear and then gate the data to line control 32. This method assures rapid data entry but slow data readout as is desired.

Address register 14 provides a means of keeping track of the different data points in storage device 12. The register is preset to a starting address prior to each run. In the data entry mode, the number in address register 14 designates the address under which the next data point will be stored. In the readout mode, the number of the address register would designate the next data point in storage device 12 which is to be transmitted to line control 32 and then to the time-share computer over line 36. After each read or write operation, the address register 14 is incremented by one count.

Register 16 provides a means of controlling the number of data collecting operations to be performed. The number of operations is preset into register 16 prior to each run. In the data read-in mode, the number in register 16 designates the number of data points or words to be collected from input devices 20 and 22 for storage in storage device 12. In the data readout mode, the number in register 16 indicates how many words of data are to be transmitted to the time-share computer or displayed on the output devices 28 and 30. The number in register 16 is decremented after each read or write operation. When register 16 reaches 0, all operations will be terminated until a new number is loaded into the register.

Sampling clock 18 provides an internal programmable timing generator to assure accurate timing pulses for sampling the analog data. Clock 18 is programmed to a specific number of pulses per second and is turned on by a trigger pulse on line 40.

The data output devices 28 and 30 can be used to display the data collected in storage device 12 or data received from the time-share computer. These output devices may provide an analog output, a digital output, or output pulses or signals to control external instruments. Multiplexor 26 is used to scan the output devices during the data readout thereto.

Line control unit 32, described in detail hereinafter, has a number of functions, namely, to recognize valid input codes, to generate internal and external command signals, to format an input code, to provide output for data and format statements, and to serialize or deserialize characters from typewriter terminal 34 of the time-share computer coupled with line 36.

The present invention utilizes a unique way of programming and controlling data collection terminal 10. All internal and external registers are loaded and all external and internal control signals are generated through command statements supplied by typewriter terminal 34 or by the time-share computer coupled with line 36. All command statements have the following format: QA = 123 which has a meaning, "load the address register 14 to address 123." Other examples of command statements are as follows:

QN = 234 load the number of operations register 16 to 234 operations

QV =4 set sampling clock 18 to a sampling speed of 4

QM = 4 execute internal command 4 (reset interface)

QE = 5 execute external command 5 (start external instrument)

QS = 567 store number 567 in storage device 12

The command code will only be recognized if immediately preceded by a carriage return signal. If a carriage return signal is followed by a code letter signal, for example, "Q", line control unit 32 will accept the following command code signal. A second letter signal called the designation code signal, will designate the exact nature of the command, for example, the letter A means to load the address counter 14. The signals representing the equal sign and the number which follows designate the number which will be loaded into the specific register. The specified loading command will be executed at the next carriage return. Internal or external commands which do not involve register loadings, for example, reset, trigger, prime and the like, have the format example of QM = 9. In this example, Q is the command code to start the command read-in, M is a designation code meaning control command, and the number 9 after the equal sign means the specific command pulse to be generated at the next carriage return.

To read data from terminal 10 into the time-share computer or to display the data, the parameters that have to be specified are the starting address in storage device 12 (example: QA = 100), the number of data points to be read (example: QN = 200), and the output format (example: QM = 3).

The carriage return after the "output format" command statement would alert terminal 10 to be ready to print data. The computer may now print any number of characters including carriage return and line feed. Terminal 10 waits for one of the number of specific characters, for instance, a question mark, an underline, a bell, a mark, a rub-out, and the like, and prints up to 10 data points followed by a line feed, carriage return and rub-out. Terminal 10 would continue printing characters 10 data points per line until all data have been transferred.

Different data readout modes may be used which are suitable to the time-sharing language which is used. Terminal 10 can be programmed either by the computer or by typewriter terminal 34. Fully automated remote data collection centers may be installed. The computer would call terminal 10, program it to collect data and read stored data into its program, compute on the data, and print the results, all without human intervention.

An important aspect of the invention is the way in which data are transmitted over the same path as that used by programs typed in by typewriter terminal 34. Characters generated by terminal 34 are directly transmitted to the time-share computer by way of telephone line 36. Thus, the line is tapped but is not disrupted. Program statements and data flow freely between the computer and terminal 34. Terminal 10 will respond only to commands when directly addressed.

Line control 32 has for its purpose to provide communication between terminal 10 and a time-share computer or typewriter terminal 34. Line control 32 accepts programming statements and converts them to internal command pulses which are used to load registers 14, 16 and 18 or to trigger other circuits, such as multiplexors 24 and 26 and clock 18. Line control 32 has data output circuits which accept data from storage device 12, converts the data to the right output code, and shifts the information onto line 36 for transfer to the time-share computer.

The circuit of line control 32 consists of the following sub-circuits: a buffer register circuit 42 (FIG. 2), a line input-output control circuit 44 (FIG. 3), a data output control circuit 46 (FIG. 5), a command decoder 48 (FIG. 6) and an internal command decoder circuit 50 (FIG. 7). The functions of each of these sub-circuits will now be described, the specific circuit diagrams being discussed hereinafter.

LINE INPUT-OUTPUT CONTROL 44 (FIG. 3)

Line input-output control circuit 44 operates to deserialize characters from the line connected with typewriter terminal 34. The circuit also examines these characters. If a carriage return signal (CR) is read, circuit 44 will check to determine if the following character is a designation code character, for example, Q. If no such designation code character is received, all sub-circuits will be reset and no data will enter control circuit 44. If the following character is a designation code character, circuit 44 will gate this character into buffer 7 of buffer register circuit 42 (FIG. 2) over line 52. Circuit 44 will accept each following character and shift all of the buffer registers of circuit 42 for each character received. Each new character will be gated into buffer 7 over line 52 and will be shifted toward buffer 1 as the next character is received at buffer 7.

When the designation code character reaches buffer 1 of circuit 42 (FIG. 2), the shifting circuit is disabled and the command statement remains in the buffer registers. Circuit 44 will then disregard all incoming characters until a carriage return character (CR) is received from the line input.

Circuit 44 will be the source of a "go" pulse on line 53 directed to command decoder circuit 48 (FIG. 6) which will examine the code in buffer 2 of buffer register circuit 42 (FIG. 2) and will generate the appropriate command pulse. Circuit 44 then generates a "reset" pulse which will reset the buffer registers of circuit 42. This pulse will travel over line 54 (FIG. 2) which is connected by line 56 to circuit 44.

If a command is received from typewriter terminal 34 which is shorter than 7 characters, for example, QM = 7 (LF) (CR), on receipt of the carriage return character (CR), circuit 44 will generate shift pulses along lines 58 and 60 (FIG. 2) until the designation code character, Q, reaches buffer 1. A programmed command is always executed at the following carriage return character.

In the data output mode, circuit 44 will receive a "-Zero bus" signal generated by the buffer registers. This signal is directed along lines 62 and 64 (FIG. 2) and its presence means that data have been gated into the buffer registers and should be shifted onto the output line 66. Circuit 44 will then read a character from buffer 1 of circuit 42 and "shift" the buffer register one position forwardly. The character is then serialized onto output line 66. Circuit 44 provides a start bit and two trailing bits for proper character transmission.

As soon as the character is read out, a new character is read into circuit 44 from buffer 1 of circuit 42 and the buffer registers again are all shifted one position forwardly. When all characters have been read out, the "Zero bus" signal will decrease in amplitude and the readout mode will be terminated until new data have been loaded into the buffer registers from storage 12.

The input-output control circuit 44 is also capable of recognizing certain characters which will cause data readout from storage device 12 if data output control circuit 46 is loaded. These characters may be a question mark, an underline, a bell, a mark, a rub-out and the like, depending upon the programming language which is used. If any one of these characters is recognized, a "proceed" pulse is sent to data output control circuit 46 along a line 67 (FIGS. 3 and 5).

Line control circuit 44 receives characters from buffer 1 of circuit 42 along line 68 (FIG. 2) which are eight bits wide and transmits data characters into buffer 7 along line 52 which are also eight bits wide.

BUFFER REGISTER CIRCUIT 42 (FIG. 2)

This circuit consists of seven identical buffer circuits, namely, buffers 1 through 7, each of which has a construction as shown in FIG. 4. In the latter figure, each buffer register is comprised of eight edge-triggered flip-flops so that each buffer register is eight bits in width. Data characters from line input-output control circuit 44 are entered into buffer 7 along line 52 (FIG. 2) and shifted forwardly in sequence toward buffer 1. Also, data characters gated into buffer register circuit 42 from data output control circuit 46 are shifted forwardly into buffer 1 and then gated into line input-output control circuit 44 along line 68.

Data from storage device 12 is in BCD code and these data characters are gated into the last four flip-flops of each of buffer 1, buffer 2 and buffer 3. The most significant digit of these data characters is directed into buffer 1 and the least significant digit is directed into buffer 3. Since each data digit fills only the last four flip-flops of a buffer register which has flip-flops, the front flip-flops of each buffer register are automatically filled.

Buffer register circuit 42 may also provide eight-bit characters on receipt of the "data load" command from data output control circuit 46 along a line 70 (FIGS. 2 and 5). Each buffer register (FIG. 4) provides for two separate characters to be gated into buffer registers circuit 42 on receipt of a "data load" command depending upon the state of gating input signals M1, M2 and M3 from data output control circuit 46 (FIGS. 2 and 5). Only one character may be gated into buffer register circuit 42 at any one time. The specific characters for each buffer register are hard-wired and these characters must conform to the specific transmission code.

The following examples of character combinations may be used, depending upon the gating signals M1, M2 and M3 from data output control circuit 46, reference being had to FIGS. 2a and 2b which show buffers 1 through 7 in block form and the way in which signals M1, M2 and M3 are applied thereto:

BUFFERS

| | B1 | B2 | B3 | B4 | | B6B5 | B7 |
|---|---|---|---|---|---|---|---|
| M1 | number | number | number | , | | | |
| M2 | | | | | (LF) | (CR) | Rub-out |
| M3 | U | E | 2= | number | (LF) | (CR) | Rub-out |

Signal M1 is used to type out data points. Signal M2 is used in conjunction with signal M1 to generate a carriage return signal after every ten data points. Line M3 is used for error code output or output from a second source. These examples are only a few suggestions of the many control line configurations which may be used to adapt circuit 42 to any programming language requirements.

DATA OUTPUT CONTROL CIRCUIT 46 (FIG. 5)

This circuit provides for proper output formating and interfacing to storage device 12 (FIG. 1). This circuit 46 is sensitized through an internal command pulse which alerts the circuit to an impending data readout from storage device 12 to buffer register circuit 42 (FIG. 2). On receipt of a "proceed" signal on line 66 (FIG. 5) from line input-output control circuit 44, data output control circuit 46 will generate a "next" pulse on line 72 (FIG. 5) and this pulse will be directed to storage device 12. Upon receipt of this pulse, storage device 12 will respond with a "data out" pulse when data is available, this last pulse being received by circuit 46 on line 74 (FIG. 5). The "data out" pulse will generate a "data load" pulse on line 70 and this pulse will be directed to buffer register circuit 42 (FIG. 2). The buffer register circuit will load the information from storage device 12, the type of control characters which are to be loaded being determined by control signals M1, M2 and M3. FIGS. 2*a* and 2*b* illustrate in block form the character combinations determined by M1, M2 and M3.

Data output control circuit 46 will wait until the amplitude of the "0 bus" signal is reduced, thereby indicating that the previously loaded data have been read out onto the output line 66; then the circuit will generate another "next" pulse on line 72 to effect loading of another data point from storage device 12 into buffer register circuit 42.

A buffer register which holds the numbers of data points to be read out will be decremented after each "-data out" pulse. This register is loaded by a previous program command. It will generate signal M2 after every ten data points to provide for line feed (LF) and carriage return (CR) and terminate the data readout operation when M2 goes to 0.

Command Decoder Circuit 48 (FIG. 6)

This circuit decodes the characters in buffer 2 of buffer register circuit 42 (FIG. 2). These characters are the "command code" characters which designate the exact register to be loaded or the exact programming command. The circuit receives all eight bits of information from buffer 2 and a "go" pulse from line input-output control circuit 44 along line 76 is directed to circuit 48. On receipt of the "go" pulse, the code character in buffer 2 is decoded and a pulse is displayed on one of the 10 output lines of circuit 48 (FIG. 6).

Internal Command Decoder Circuit 50 (FIG. 7)

This circuit provides pulses for internal control of data collection terminal 10 such as pulses which reset all registers, pulses which prime interrupts, pulses which start the sampling, and the like. The program command may have the format QM = 5, Q being the designation code to alert line input-output control circuit 44 to accept the command, M being the command code meaning internal command pulse, and the number 5 indicating control pulse 5. Internal command decoder circuit 50 receives the last four bits of buffer 4 and decodes the same into ten output lines. On receipt of a program command pulse, one of the ten output lines will display a command pulse.

OPERATION

Line control circuit 44 performs the following functions:

1. Character and command read-in.
2. Character and data readout.

Both functions will now be described with reference to the timing diagrams denoted by FIGS. 8–11.

Character and Command Read-in

A character generated by typewriter terminal 34 consists in ASC II code of eight bits plus one start bit and two trailing bits. In the idle state, the line from the typewriter terminal is at logical 1 as denoted by the term "line input" as shown in FIG. 9. The first bit of a character which is received is a start bit which is a logical 0. If circuit 44 is not in the send mode, that is, if the send flip-flop 80 (FIG. 3) is reset, the line character will be gated to the input of a 12-bit shift register 82. A line flip-flop 84 will be set by the start bit. After a delay of ½ of the length of a bit, a clock 86 will be actuated. This delay assures that the incoming data is sampled in the middle of each bit where its state is most securely established. The clock frequency is equal to the bit rate received from the line. The line flip-flop operation, the delay and the clock pulses are indicated in FIG. 9.

Clock 86 will cause information from the input line to be shifted forward into shift register 82. After 11 shifts have been made, the start bit will enter into the eleventh flip-flop 88 of shift register 82, flip-flop 88 being used to actuate two one-shot multivibrators 90 and 92. The output from multivibrator 90, indicated by SS1 in FIG. 9 will enable certain gates denoted by C1, C2, C3, C4, C5, CR and Q in FIG. 3. The inputs to each of these gates are connected to the outputs of certain flip-flops of shift register 82, such outputs denoted by Q1 through Q8. These gates will examine the character which is received. The output from multivibrator 92, denoted by SS2 in FIG. 9, is connected by a lead 94 to the reset terminal of line flip-flop 84 and will cause the latter flip-flop to reset and will also clock information into a carriage return flip-flop 96 by way of a lead 98. If the character received is a carriage return character, multivibrator 92 will clock a one state into carriage return flip-flop 96 which will, in turn, put a one state onto a character flip-flop 100 by way of lead 102. Multivibrator 90, timing out, will trigger another one-shot multivibrator 104 whose output is coupled by a lead 106 to the set terminals of the flip-flops of shift register 82. Thus, the output of multivibrator 104 will present the flip-flops of shift register 82 to logical ones.

When a second character arrives on the input line, the previous sequence will be repeated. If this second character is a designation code character, for example, Q, multivibrator 90 will enable a gate permitting the generation of a Q signal which, by means of lead 108, disables the reset of character flip-flop 100. Multivibrator 92, timing out, will clock the one state from flip-flop 96 which had been set on the last character, into flip-flop 100. Flip-flop 100 will go to the one state and trigger a one-shot multivibrator 110 which will generate a shift command on lead 58 connected to lead 60 so that the shift command will be directed to buffers 1 through 7 and buffer register circuit 42 will read the character Q into buffer 7. Multivibrator 110 also sets a receive flip-flop 112 and character flip-flop 96 and Q flip-flop 100 are reset.

The next character received from the input line will trigger multivibrator 92 again, which, since receive flip-flop 112 is set, will cause another shift on the buffer register. This will transfer the character Q in buffer 7 to buffer 6 and a new character will be put into buffer 7. Each new arriving character will cause the buffer register to shift its contents and read the new character into buffer 7. When the Q character first read arrives at buffer 1, it is decoded on the input gate 114 whose output disables the "shift" line. Each following character, although read into the shift register, will not be read into the buffer register. The buffer register will then remain stationary until the carriage return character is received. The numerical portion of each command in the buffer is in buffers 4, 5, and 6 and these buffers are connected by gate means (not shown) responsive to a particular command put out by command decoder 48 to direct the numerical data in buffers 4, 5 and 6 to a particular register.

The carriage return character, decoded on character gate 96, and enabled by multivibrator 90 will cause a one state to be gated into character flip-flop 96. Multivibrator 92 will set character flip-flop 96 and the latter flip-flop, together with the Q character in buffer 1, will reset receive flip-flop 112. Flip-flop 112 being reset, triggers a multivibrator 116 which sends a "go" pulse to command decoder circuit 48 by way of lead 76. Multivibrator 116, timing out, will trigger another multivibrator 118 which generates a reset pulse for the buffer register and for character flip-flop 96. The reset pulse to the buffers of buffer register 42 is directed along leads 56 and 54 (FIG. 2).

If a command statement, for example, QM = 5, is received, the carriage return would occur before the Q character reaches buffer 1. In this case, character flip-flop 96, being set in conjunction with receive flip-flop 112, enables a clock which sends fast shift pulses to the buffer register circuit 42. When the character Q reaches buffer 1, it resets receive flip-flop 112 which generates the go and reset pulses. The foregoing is illustrated in FIG. 8.

Character and Data Readout

Data and command characters are gated into buffer register circuit 42 (FIG. 2). This causes the zero bus line to come up to logical 1. If receive flip-flop 112 is reset, then send flip-flop 80 will be set. Send flip-flop 80, coming to the logical 1 state, will trigger a multivibrator 120, whose output will cause the loading of the character which is in buffer one into shift register 82. All eight bits being loaded and the start bit and the two trailing bits are supplied.

Since a character is now in the shift register, the gate which generates the zero bus signal is no longer satisfied and the R signal will go to logical zero. This enables a gate to activate a delay device 122. After a short while, serializing clock 86 will start serializing the character onto the output line 66. The clock will supply shift impulses until the shift registers all zero, which means the character has been serialized on the output line. At this time, the "zero" gate 124 and the control gate 126 are satisfied and the R signal will be generated. The R signal triggers a multivibrator 128 whose output will attempt to reset send flip-flop 80 but will not succeed if the zero bus line is at logical zero. Multivibrator 128 will also generate a shift command to the buffer register circuit 42. This will put the next character in the buffer 1. Multivibrator 128, timing out, triggers another multivibrator 130 which loads the new character which is in buffer 1 into shift register 82. This will drop the R line to logical zero which will reactivate serializing clock 86.

If the character loaded from buffer 1 was not a character but just an empty space, the timing out of multivibrator 130 will fire a multivibrator 132 whose output and the output from zero gate 124 will fire a multivibrator 134. The last-mentioned multivibrator, upon triggering multivibrator 128, will cause another shift and load pulse. This will repeat until a real character is loaded into the shift register. Data is read in parallel out of the storage unit into buffers 1, 2 and 3 as shown in FIG. 2, there being gate means (not shown) which is enabled to permit read-in of data to these buffers at the proper time. An error output from the storage unit can be read into buffer 4.

When the last character which has previously been transmitted is in buffer 1, the next time multivibrator 128 is generating a shift command, the zero bus line will drop to logical zero during the shift interval. This will reset the send flip-flop 80 and cancel the next load pulse. This is shown in FIG. 11.

Buffer Register

Buffer register circuit 42 consists of a number of buffers each containing edge-triggered flip-flops. The positive edge of the shift signal will gate information from the previous buffer into the edge-triggered flip-flops while the information currently being in the flip-flops is gated to the next buffer. A shift pulse will, therefore, transfer a whole character into the next stage. The shift pulses are supplied by input control circuit 44. A reset pulse which sets all flip-flops of the buffer circuit 42 to zero is also supplied by circuit 44.

To transfer data from storage device 12 onto output line 66, the raw BCD coded data must first be converted into readable characters as specified by the transmission code used. The BCD data enters into the last four flip-flops if enabled by a gating line (M1, M2 or M3) and the data load line 70. Each buffer has a provision to gate one of two distinct characters into the flip-flops; one of them may be a number. These characters must be hard-wired and preselected on a printed circuit board or the like. These various characters are specified in FIGS. 2*a* and 2*b*.

Each buffer circuit contains also a gate which is satisfied when all flip-flops are in the zero state. If data is loaded into the buffer, this gate will go to zero. The outputs of these gates are tied together on all seven buffer circuits to generate the zero bus line, each such gate being noted by the numeral 136 and shown adjacent to FIG. 4. If any character is loaded into the buffer register circuit 42, this zero bus line will be zero.

Data Output Control

To start a data readout procedure, data output control circuit 46 (FIG. 5) must be activated by an internal control pulse. This pulse is supplied by the internal command decoder 48 (FIG. 6) on receipt of a programming command, for example, QM = 7. The internal control pulse will set the command flip-flop 138 (FIG. 5). The circuit now waits for a proceed pulse over line 67 from line control circuit 44 (FIGS. 3). The proceed pulse will set a mode flip-flop 140 which will enable control line M1 and trigger a multivibrator 142, the latter being operable to generate a "next" pulse on line 72 to storage device 12 which, after a short time, will make data available for the buffer register circuit 42. Also, multivibrator 142 will generate a "data out" pulse on line 74. This data out pulse will generate a "-data load" pulse on line 70 to cause data to be loaded into buffer register circuit 42. The data out pulse will also decrement a three-digit decimal counter 144 (FIG. 5).

Since data has been loaded into buffer register circuit 42, the zero bus line will drop to logical zero and the line control circuit 44 will proceed with reading data onto output line 66. As soon as all the data have been shifted out of buffer register circuit 42, the zero bus line will again come up and trigger a multivibrator 146 which will, in turn, generate another "next" pulse to storage device 12 and another word will be loaded into buffer register circuit 42. This will go until the counter 144 will go to zero which will reset mode flip-flop 140 and the command flip-flop 138.

Every time during data readout when the least significant digit of the counter 144 is on 9, the control line M2 will reactivate it. This will supply an automatic line feed, character return and rub-out on the end of the data point. The circuit will, therefore, permit the readout of a string of ten data points followed by a line feed and a carriage return.

Data readout may be initiated by a second source such as an error code output to be displaced on the typewriter terminal if the circuit is not in data readout mode, which means that mode flip-flop 140 is reset and the zero bus signal is at logical one, an error signal will enable control line M3 and will cause the triggering of a multivibrator 148. Multivibrator 148 will generate a data load command to read the error code into the buffer register from where it is shifted onto the output line 66.

Command Decoder

The command decoder circuit 48 (FIG. 6) consists of a number of AND gates 150 which decode a character coded from buffer 2. The go command from control circuit 44 will activate the gates and the gate which is satisfied will put out a command pulse to load internal registers or to activate other circuits. Only one gate 150 will be activated at any one time. If an invalid code character is read into the buffer register circuit 42, no command pulse will be generated and the code is ignored.

Internal Command Decoder

This circuit, shown in FIG. 7, contains a BCD to decimal decoder which decodes the number in buffer 4. Only the last four bits contain the number information. Each of the ten lines from the BCD to decimal decoder is enabled by a command pulse from the command decoder on a line 152. Only one line at a time will display a pulse command.

An important aspect of the present invention is the way data is transmitted over the same data path as programs typed in by a typewriter terminal. Characters generated by the typewriter terminal are directly transmitted to the computer by way of a telephone line. A unique part of the present invention is the way in which this line is tapped but not disrupted. Program statements and data can flow freely between the computer and the typewriter terminal. The data collection terminal will only respond to commands when directly addressed. As to the computer, it appears that the typewriter terminal is generating characters and vice versa.

I claim:

1. A data collection terminal comprising: a data storage unit for storing digital data, said device having a data input and a data output; means coupled with the data input of the storage device for directing digital data thereinto; a first command-responsive device coupled with said directing means for controlling the amount of digital data directed into the storage unit; a second command-responsive device coupled with the first device for controlling the rate at which digital data is directed to the storage unit; a third command-responsive device coupled with the storage unit for controlling the locations thereof into which the incoming data are directed; and a control unit having a command input adapted to be coupled with a source of commands, a command output coupled to said command-responsive devices, a data input coupled with the storage unit, and a data output adapted to be coupled with a data processing unit, said control unit including means between the command input and command output thereof for receiving and deserializing a number of command-defining characters received at said command input thereof from said command source, only when the command-defining characters are preceded by a code-defining character, said control unit further including means between the data input and data output thereof for receiving and serializing data from the storage unit; means coupling said command output of said control unit with said device, whereby any one of a number of commands can be selectively directed to a command-responsive device; and means coupling the data output of said storage unit to the data input of said control unit, whereby data can be directed through said receiving and serializing means to said data output of the control unit.

2. A data collection terminal as set forth in claim 1, wherein said receiving and deserializing means includes a shift register coupled with said command input, and a buffer coupled to the shift register for receiving successive characters therefrom after the predetermined code has been received by the shift register, actuatable means coupled with the shift register for clocking a command character into the buffer, means responsive to the presence of a character in said shift register for actuating said clocking means, means coupled with said clocking means for disabling said clocking means after a predetermined number of characters have been received in said buffer, and means for coupling the buffer with the command-responsive devices, whereby said devices can selectively receive commands from said control unit.

3. A data collection terminal as set forth in claim 2, wherein said buffer includes a plurality of buffer sections coupled in series to successively receive command-defining characters, said means for coupling the buffer with said devices including a decoder connected to one of the buffer sections, said decoder having a number of command signal outputs coupled with respective devices.

4. A data collection terminal as set forth in claim 2, wherein said buffer comprises a number of buffer sections coupled in series to successively receive command-defining characters, certain of the buffer sections being operable to receive the numerical characters of a command, and gate means enabled by a command signal from the decoder for coupling said certain buffer sections to a command-responsive device corresponding to said command signal for readout of said numerical characters thereto.

5. A data collection terminal as set forth in claim 3, wherein is included a second decoder coupled with a second of said buffer sections and to a command signal output of the first-mentioned decoder, the second decoder being operable to provide internal commands to said command-responsive devices in response to a character in said other buffer section.

6. A data collection terminal as set forth in claim 1, wherein said data receiving and serializing means includes a buffer, a data control device for generating an enabling signal in response to the availability of data-receiving space in said buffer, said storage unit being coupled to the signal generating means and being operable to read data into the buffer in response to the generation of said enabling signal, and means coupling said buffer with said data output of the control unit for serially reading data in the buffer to said data output.

7. A data collection terminal as set forth in claim 6, wherein said buffer includes a number of buffer sections coupled in series to successively receive command-defining characters, and gate means coupled with certain of said buffer sections for parallel readout of data from said storage unit to said certain buffer sections in response to said enabling signal, said means coupling the buffer with said data output including a shift register for successively receiving characters from the buffer, and means for clocking the shift register as a function of the availability of data receiving space therein.

8. A data collection terminal as set forth in claim 6, wherein is included a decoder for actuating said data control device in response to the presence of a number of command characters in the buffer.

9. A data collection terminal as set forth in claim 1, wherein is included a typewriter terminal, a computer in communication with the typewriter terminal, said control unit being coupled to the typewriter terminal and the computer, the typewriter terminal being coupled to the computer in bypassing relationship to the control unit unless said predetermined code is received by the control unit.

10. A data collection terminal as set forth in claim 1, wherein said directing means includes a first input device having means for sensing analog data and provided with an analog-to-digital converter, a second input device having means for sensing digital data, and a multiplexor for successively coupling the input devices with the data input of said storage unit.

11. A data collection terminal as set forth in claim 1, wherein is included output means coupled with the data output of the storage unit for display of data received from the storage unit.

* * * * *